(12) United States Patent
Kratzer

(10) Patent No.: US 7,618,912 B2
(45) Date of Patent: Nov. 17, 2009

(54) PREPARATION OF SUPPORTED CATALYST SYSTEMS

(75) Inventor: Roland Kratzer, Hofheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/521,073

(22) PCT Filed: Jul. 14, 2003

(86) PCT No.: PCT/EP03/07568

§ 371 (c)(1),
(2), (4) Date: Jul. 6, 2005

(87) PCT Pub. No.: WO2004/007570

PCT Pub. Date: Jan. 22, 2004

(65) Prior Publication Data

US 2006/0166813 A1    Jul. 27, 2006

Related U.S. Application Data

(60) Provisional application No. 60/401,207, filed on Aug. 5, 2002.

(30) Foreign Application Priority Data

Jul. 15, 2002    (DE) ............................. 102 32 081

(51) Int. Cl.
*B01J 31/16*    (2006.01)
*C08F 4/622*    (2006.01)
*C08F 4/642*    (2006.01)
*C08F 4/6592*   (2006.01)

(52) U.S. Cl. .................. 502/123; 502/104; 502/120; 502/132; 502/154; 502/155

(58) Field of Classification Search .............. 502/110, 502/122, 123, 125, 104, 120, 132, 154, 155
See application file for complete search history.

(56) References Cited

U.S. PATENT DOCUMENTS

| 6,417,302 | B1 * | 7/2002 | Bohnen ..................... 502/132 |
| 6,482,902 | B1 * | 11/2002 | Bohnen et al. ............. 502/123 |
| 6,576,723 | B1 | 6/2003 | Bohnen et al. |
| 6,784,261 | B1 | 8/2004 | Schopf et al. |
| 7,285,513 | B2 | 10/2007 | Kratzer et al. |
| 2003/0004052 | A1 | 1/2003 | Lynch et al. |
| 2003/0008984 | A1 | 1/2003 | Kratzer et al. |
| 2003/0144434 | A1 | 7/2003 | Schottek |

FOREIGN PATENT DOCUMENTS

| DE | 197 10 615 | 9/1998 |
| EP | 1 153 938 | 11/2001 |
| WO | WO-96/04319 | 2/1996 |
| WO | WO-96/23005 | 8/1996 |
| WO | WO-98-22486 | 5/1998 |
| WO | WO-99/06414 | 2/1999 |
| WO | WO-99/33881 | 7/1999 |
| WO | WO-99/40129 | 8/1999 |
| WO | WO-99/61487 | 12/1999 |
| WO | WO-99/61488 | 12/1999 |
| WO | WO-00/31090 | 6/2000 |
| WO | WO-00/62928 | 10/2000 |
| WO | WO-0064906 | 11/2000 |
| WO | WO-01/09148 | 2/2001 |
| WO | WO-01/47635 | 7/2001 |
| WO | WO-01/90112 | 11/2001 |
| WO | WO-02/098930 | 12/2002 |
| WO | WO 2004/007569 | 1/2004 |

OTHER PUBLICATIONS

Wiesenfeldt et al. "*ansa*-Metallocene derivatives XVII. Racemic and *meso* diastereomers of gorup IV metallocene derivatives with symmetrically substituted, dimethylsilanediuyl-bridged ligand framworks. Crystal structure of $R,S$-Me$_2$Si(3-t-Bu-5-MeC$_5$H$_2$)$_2$ZrCl$_2$", *Journal of Organometallic Chemistry*, 369 pp. 359-370(1989).

Jutzi et al. "Cyclopentadienyl compounds with nitrogen donors in the side-chain", *Journal of Organometallic Chemistry*, 500, pp. 175-185(1995).

Enders et al. "B-Quinolylcyclopentadienyl, a Ligand with a Tailored Fit for Chelate Complexes", *Chem. Ber.*, 129, pp. 459-463 (1996).

Small et al., "Highly Active Iron and Cobalt Catalysts for the Polymerization of Ethylene", *J. Am. Chem. Soc.* 120, p. 4049 (1998).

Britovsek et al., "Novel Olefin Polymerization Catalysts Based on Iron and Cobalt", *J. Chem. Soc., Chem. Commun.* 1998, p. 849.

* cited by examiner

*Primary Examiner*—Caixia Lu
(74) *Attorney, Agent, or Firm*—Jarrod Raphael; Jonathan L. Schuchardt

(57) ABSTRACT

The present invention relates to a process for preparing a catalyst solid for olefin polymerization which is obtainable by bringing A) at least one organic transition metal compound,
B) at least one organometallic compound,
C) at least one organic compound having at least one functional group containing active hydrogen,
D) at least one Lewis base and
E) at least one support, into contact with one another, wherein the components are combined in any order without any work-up of the mixtures present at intermediate stages being carried out. In addition, the invention relates to the use of the catalyst solid for olefin polymerization, to catalyst solids obtainable by this process, to catalyst systems in which these catalyst solids are present and to a process for the polymerization of olefins in which these catalyst solids are used.

20 Claims, No Drawings

PREPARATION OF SUPPORTED CATALYST SYSTEMS

This application is a national stage application (under 35 U.S.C. 371) of PCT/EP2003/007568 filed Jul. 14, 2003 which claims benefit to German application serial no. 102 32 081.0 filed Jul. 15, 2002 and U.S. Provisional Application 60/401,207 filed Aug. 5, 2002.

The present invention relates to a process for preparing a catalyst solid for olefin polymerization which is obtainable by bringing at least one organic transition metal compound, at least one organometallic compound, at least one organic compound having at least one functional group containing active hydrogen, at least one Lewis base and at least one support into contact with one another, to the use of the catalyst solids for olefin polymerization, to catalyst solids obtainable by this process, to catalyst systems in which these catalyst solids are present and to a process for the polymerization of olefins in which these catalyst solids are used.

Organic transition metal compounds such as metallocene complexes are of great interest as catalysts for olefin polymerization since they make it possible to synthesize polyolefins which cannot be obtained using conventional Ziegler-Natta catalysts. For example, such single site catalysts lead to polymers having a narrow molar mass distribution and a uniform comonomer content. For these to be able to be used successfully in polymerization processes in the gas phase or in suspension, it is often advantageous for the metallocenes to be used in the form of a solid, i.e. for them to be applied to a solid support. Furthermore, the supported catalysts should have a high productivity and lead to polymers having a good morphology. In terms of the latter, it is extremely disadvantageous for constituents of the catalyst system to be released from the catalyst solid during the polymerization ("leaching").

For organic transition metal compounds such as metallocene complexes to be active as catalysts for olefin polymerization it is necessary for them to be reacted with further compounds which serve as cocatalysts. One frequently used class of cocatalysts consists of aluminoxanes such as methylaluminoxane (MAO). However, these have the disadvantage that they have to be used in a large excess. Further cocatalysts which can be used are compounds which convert the organic transition metal compounds into cationic complexes and can be used in stoichiometric or virtually stoichiometric ratios.

WO 96/04319, WO 96/23005 and WO 99/33881 describe catalyst systems in whose preparation a support is firstly reacted with a Lewis base and a Lewis acid such as trispentafluorophenylborane acting as cocatalyst. The modified support in which the Lewis acid is covalently bound to the support material is subsequently reacted with a metallocene or a mixture of a metallocene and an organometallic compound. However, no organic compounds having functional groups containing active hydrogen are used for the preparation of the catalyst systems.

WO 00/64906 discloses catalyst systems in which a metallocene, an organometallic compound and a compound obtainable by reaction of an organometallic compound with an organic compound having functional groups containing active hydrogen are brought into contact with a support. However, no Lewis bases are used in the preparation of the catalyst systems.

EP-A 1 153 938 describes catalyst systems in which a modified support is firstly prepared by reacting a support with an organometallic compound and an organic compound having functional groups containing active hydrogen or a Lewis base. The modified support is then brought into contact with an organic transition metal compound and a further organometallic compound.

WO 99/40129, WO 00/62928 and WO 01/47635 describe catalyst systems comprising a metallocene, a Lewis base, a support and a compound which is obtainable by reaction of an organometallic compound with an organic compound bearing functional groups containing active hydrogen. Furthermore, another organometallic compound may additionally be present. WO 01/90112 describes catalyst systems comprising, as cocatalyst, the reaction product of an organometallic compound with a water-containing compound bearing at least two functional groups containing active hydrogen, e.g. OH groups. The catalyst systems can further comprise not only an organic transition metal compound but also a support and a main group alkyl compound. Furthermore, they can further comprise a Lewis base. These catalyst systems are in each case prepared by firstly reacting the Lewis base and the reaction product of the organometallic compound with the organic compound having functional groups containing active hydrogen with the support and subsequently bringing the isolated, washed and dried modified support solid into contact with a suspension or solution of the metallocene and optionally the organometallic compound.

It is an object of the present invention to find a process for preparing a catalyst solid for olefin polymerization which is relatively simple and requires fewer purification steps. It should be possible to obtain catalyst solids having an increased polymerization activity or a good polymerization activity of the catalyst solids should be able to be achieved using a smaller amount of expensive starting materials such as boron-containing compounds or transition metal compounds.

We have found that this object is achieved by a process for preparing a catalyst for olefin polymerization which is obtainable by bringing A) at least one organic transition metal compound, B) at least one organometallic compound, C) at least one organic compound having at least one functional group containing active hydrogen, D) at least one Lewis base and E) at least one support, wherein the components are combined in any order without any work-up of the mixtures present at intermediate stages being carried out.

Furthermore, we have found the use of the catalyst solids for olefin polymerization, catalyst solids obtainable by this process, catalyst systems comprising these catalyst solids and a process for the polymerization of olefins in which these catalyst solids are used.

The catalyst solids prepared according to the present invention are suitable for the polymerization of olefins and especially for the polymerization of α-olefins, i.e. hydrocarbons having terminal double bonds. Suitable monomers include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure which may comprise one or more ring systems. Examples of such olefins are cyclopentene, norbornene, tetracyclododecene and methylnorbornene and dienes such as 5-ethylidene-2-norbornene, norbornadiene and ethylnorbornadiene.

It is also possible to polymerize mixtures of two or more olefins.

The catalyst solids of the present invention are particularly useful for the polymerization or copolymerization of ethylene or propylene. As comonomers in ethylene polymerization, preference is given to using $C_3$-$C_8$-α-olefins, in particular 1-butene, 1-pentene, 1-hexene and/or 1-octene. Preferred comonomers in propylene polymerization are ethylene and/or 1-butene.

As organic transition metal compound A), it is in principle possible to use any compounds of the transition metals of groups 3 to 12 of the Periodic Table or the lanthanides which contain organic groups and preferably form active olefin polymerization catalysts after reaction with the components B) and E). These are usually compounds in which at least one monodentate or polydentate ligand is bound to the central atom via sigma or pi bonds. Possible ligands include ones containing cyclopentadienyl radicals and also ones which are free of cyclopentadienyl radicals. A large number of such compounds A) suitable for olefin polymerization are described in Chem. Rev. 2000, Vol. 100, No. 4. Furthermore, polycyclic cyclopentadienyl complexes are also suitable for olefin polymerization.

Particularly useful organic transition metal compounds A) are ones containing at least one cyclopentadienyl-type ligand. Those containing two cyclopentadienyl-type ligands are commonly referred to as metallocene complexes. Among organic transition metal compounds A) containing at least one cyclopentadienyl-type ligand, compounds which have been found to be particularly suitable are those of the formula (I)

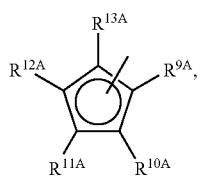

(I)

where the substituents and indices have the following meanings:
$m^{1A}$ is titanium, zirconium, hafnium, vanadium, niobium, tantalum, chromium, molybdenum or tungsten, or en element of group 3 of the Periodic Table or the lanthanides,
$X^A$ are identical or different and are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$R^{6A}$ or —$NR^{6A}R^{7A}$ or two radicals $X^A$ are joined to one another and together form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical,
$n^A$ is 1, 2 or 3, where $n^A$ is such that the metallocene complex of the formula (I) is uncharged for the given valence of M,
$R^{1A}$ to $R^{5A}$ are each, independently of one another, hydrogen, $C_1$-$C_{22}$-alkyl, 5- to 7 membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which contains at least one atom selected from the group consisting of N, P, O and S, where
$R^{8A}$ are identical or different and can each be $C_1$-$C_{10}$-alkyl, $C_3$-$C_{10}$-Cycloalkyl, $C_6$-$C_{15}$-aryl, $C_1$-$C_4$-alkoxy or $C_6$-$C_{10}$-aryloxy and
$Z^A$ is as defined for $X^A$ or is

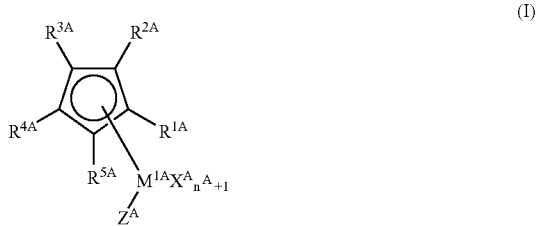

where the radicals
$R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, —$OSiR^{14A}_3$, —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which contains at least one atom selected from the group consisting of N, P, O and S, where
$R^{14A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, or the radicals $R^{4A}$ and $Z^A$ together form an —$R^{15A}_{v^A}$-$A^A$- group, where

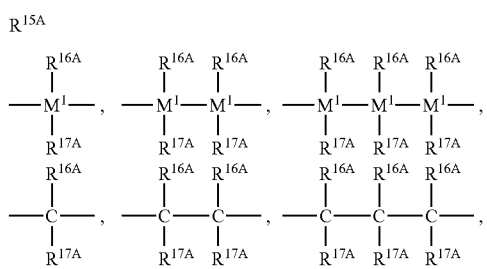

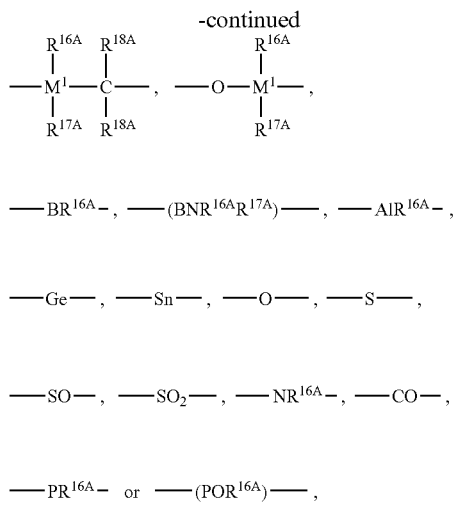

where $R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2A}$ is silicon, germanium or tin, preferably silicon, $A^A$ is —O—, —S—, —$NR^{19A}$—, —$PR^{19A}$—, —O—$R^{19A}$, —$NR^{19A}$—, —$PR^{19A}_2$ or an unsubstituted, substituted or fused, heterocyclic ring system, where $R^{19A}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or —Si($R^{20A}$)$_3$, $R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, $v^A$ is 1 or, if $A^A$ is an unsubstituted, substituted or fused, heterocyclic ring system, 1 or 0 or the radicals $R^{4A}$ and $R^{12A}$ together form an —$R^{15A}$— group.

It is preferred that the radicals $X^A$ in the formula (I) are identical, preferably fluorine, chlorine, bromine, $C_1$-$C_7$-alkyl or arylalkyl, in particular chlorine, methyl or benzyl.

Among the organic transition metal compounds of the formula (I), preference is given to

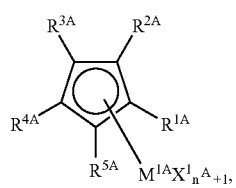

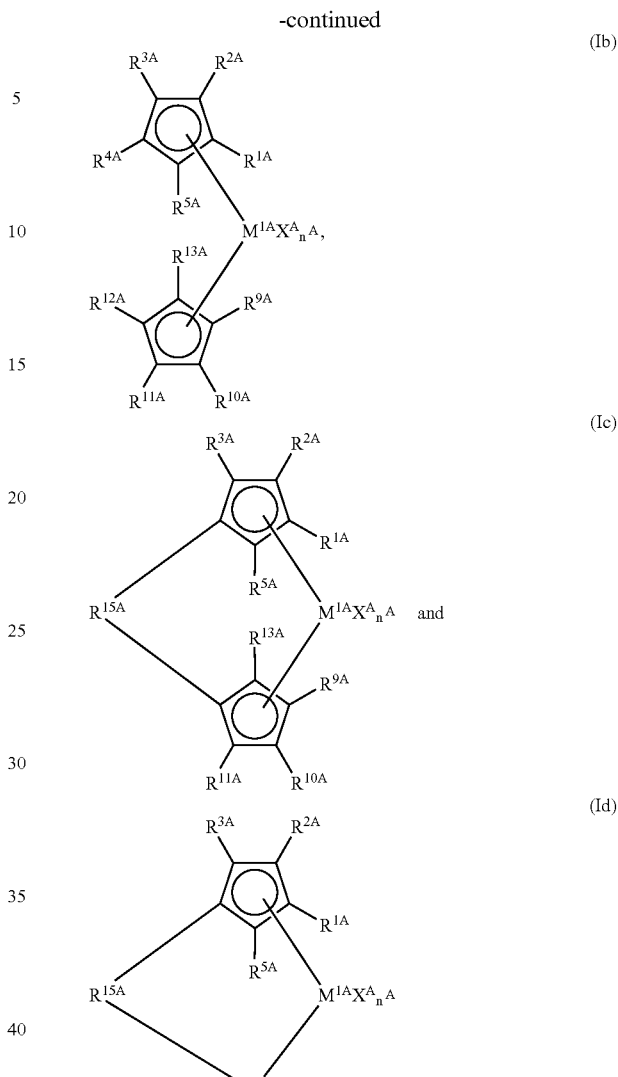

Among the compounds of the formula (Ia), particular preference is given to those in which $M^{1A}$ is titanium or chromium, $X^A$ is chlorine, $C_1$-$C_4$-alkyl, phenyl, alkoxy or aryloxy, $n^A$ is 1 or 2 and $R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (Ib), preference is given to those in which $M^{1A}$ is titanium, zirconium, hafnium or chromium, $X^A$ is chlorine, $C_1$-$C_4$-alkyl or benzyl, or two radicals X form a substituted or unsubstituted butadiene ligand, $n^A$ is 1 or 2, preferably 2, or, if $M^{1A}$ is chromium, 0, $R^{1A}$ to $R^{5A}$ are each hydrogen, $C_1$-$C_8$-alkyl, $C_6$-$C_{10}$-aryl, —$NR^{8A}_2$, —$OSiR^{8A}_3$, —$SiR^{8A}_3$ or —Si($R^{8A}$)$_3$ and $R^{9A}$ to $R^{13a}$ are each hydrogen, $C_1$-$C_8$-alkyl, $C_6$-$C_{10}$-aryl, —$NR^{8A}_2$, —$OSiR^{8A}_3$, —$SiR^{8A}_3$ or —Si($R^{8A}$)$_3$ or in each case two radicals $R^{1A}$ to $R^{5A}$ and/or $R^{9A}$ to $R^{13A}$ together with the cyclopentadienyl ring form an indenyl or substituted indenyl system.

Particularly useful compounds of the formula (Ib) are those in which the cyclopentadienyl radicals are identical.

Examples of particularly useful compounds of the formula (Ib) are
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride
and also the corresponding dimethylzirconium compounds.

Particularly useful metallocenes of the formula (Ic) are those in which
$R^{1A}$ and $R^{9A}$ are identical or different and are each hydrogen or a $C_1$-$C_{10}$-alkyl group,
$R^{5A}$ and $R^{13A}$ are identical or different and are each hydrogen or a methyl, ethyl, isopropyl or tert-butyl group,
$R^{3A}$ and $R^{11A}$ are each $C_1$-$C_4$-alkyl and
$R^{2A}$ and $R^{10A}$ are each hydrogen or two adjacent radicals $R^{2A}$ and $R^{3A}$ or $R^{10A}$ and $R^{11A}$ together form a saturated or unsaturated cyclic group having from 4 to 44 carbon atoms,
$R^{15A}$ is -$M^{2A}R^{16A}R^{17A}$ — or —$CR^{16A}R^{17A}$—$CR^{16A}R^{17A}$— or —$BR^{16A}$— or —$BNR^{16A}R^{17A}$—,
$M^{1A}$ is titanium, zirconium or hafnium and
$X^A$ are identical or different and are each chlorine, $C_1$-$C_4$-alkyl, benzyl, phenyl or $C_7$-$C_{15}$-alkylaryloxy.

Particularly useful compounds of the formula (Ic) are those of the formula (Ic')

(Ic')

where
the radicals $R'^A$ are identical or different and are each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl,
$R^{5A}$ and $R^{13A}$ are identical or different and are each hydrogen, $C_1$-$C_6$-alkyl, preferably methyl, ethyl, isopropyl, n-propyl, n-butyl, n-hexyl or tert-butyl,
and the rings S and T are identical or different, saturated, unsaturated or partially saturated.

The indenyl or tetrahydroindenyl ligands of the metallocenes of the formula (Ic') are preferably substituted in the 2 position, the 2, 4 positions, the 4, 7 positions, the 2, 4, 7 positions, the 2, 6 positions, the 2, 4, 6 positions, the 2, 5, 6 positions, the 2, 4, 5, 6 positions or the 2, 4, 5, 6, 7 positions, in particular in the 2, 4 positions, with the following nomenclature being employed for the site of substitution:

As complexes (Ic'), preference is given to using bridged bisindenyl complexes in the rac or pseudo-rac form. For the present purposes, the pseudo-rac form refers to complexes in which the two indenyl ligands are in the rac arrangement relative to one another when all other substituents of the complex are disregarded.

Examples of particularly useful metallocenes (Ic) and (Ic') are
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride
dimethylsilanediylbis(2-ethyl-4,5-benzindenyl)zirconium dichloride
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride, dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-[p-trifluoromethylphenyl]indenyl)zirconium dichloride,
dimethylsilanediylbis(2-methyl-4-[3',5'-dimethyphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)-(2-methyl-4-phenylindenyl)zirconium dichloride,
dimethylsilanediyl(2-isopropyl-4-(1-naphthyl)indenyl)-(2-methyl-4-(1-naphthyl)indenyl)zirconium dichloride,
dimethylsilanediyl(2-isopropyl-4-[4'-tert-butylphenyl]indenyl)-(2-methyl-4-[4'-tert-butylphenyl]-indenyl)zirconium dichloride,
dimethylsilanediyl(2-isopropyl-4-[4'-tert-butylphenyl]indenyl)-(2-ethyl-4-[4'-tert-butylphenyl]-indenyl)zirconium dichloride,
dimethylsilanediyl(2-isopropyl-4-[4'-tert-butylphenyl]indenyl)-(2-methyl-4-[3',5'-bis-tert-butylphenyl]indenyl)zirconium dichloride,
dimethylsilanediyl(2-isopropyl-4-[4'-tert-butylphenyl]indenyl)-(2-methyl-4-[1'-naphthyl]indenyl)-zirconium dichloride and
ethylene(2-isopropyl-4-[4'-tert-butylphenyl]indenyl)-(2-methyl-4-[4'-tert-butylphenyl]indenyl)-zirconium dichloride and the corresponding dimethylzirconium, monochloromono(alkylaryloxy)zirconium and di-(alkylaryloxy)zirconium compounds.

Particularly useful compounds of the formula (Id) are those in which
$M^{1A}$ is titanium or zirconium, in particular titanium, and
$X^A$ is chlorine, $C_1$-$C_4$-alkyl or phenyl or two radicals X together form a substituted or unsubstituted butadiene ligand,
$R^{15A}$ is —$SiR^{16A}R^{17A}$— or —$CR^{16A}R^{17A}$—$CR^{16A}R^{17A}$—, and
$A^A$ is —O—, —S— or —$NR^{19A}$—, $R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —Si($R^{8A}$)$_3$, or two adjacent radicals form a cyclic group having from 4 to 12 carbon atoms, with particular preference being given to all $R^{1A}$ to $R^{3A}$ and $R^{5A}$ being methyl.

Another group of compounds of the formula (Id) which are particularly useful are those in which
$M^{1A}$ is titanium or chromium, preferably in the oxidation state III and
$X^A$ is chlorine, $C_1$-$C_4$-alkyl or phenyl or two radicals $X^A$ form a substituted or unsubstituted butadiene ligand,
$R^{15A}$ is —$SiR^{16A}R^{17A}$— or —$CR^{16A}R^{17A}$—$CR^{16A}R^{17A}$—, and
$A^A$ is —O—$R^{19A}$, —$NR^{19A}_2$, —$PR^{19A}_2$
$R^{1A}$ to $R^{3A}$ and $R^{5A}$ are each hydrogen, $C_1$-$C_{10}$-alkyl, $C_3$-$C_{10}$-cycloalkyl, $C_6$-$C_{15}$-aryl or —Si($R^{8A}$)$_3$, or two adjacent radicals form a cyclic group having from 4 to 12 carbon atoms.

The synthesis of such complexes can be carried out by methods known per se, with preference being given to the reaction of the appropriately substituted, cyclic hydrocarbon anions with halides of titanium, zirconium, hafnium, vanadium, niobium, tantalum or chromium.

Examples of appropriate preparative methods are described, for example, in Journal of Organometallic Chemistry, 369 (1989), 359-370.

Further suitable organic transition metal compounds A) are metallocenes having at least one ligand which is formed by a cyclopentadienyl or heterocyclopentadienyl and a fused-on heterocycle. In the heterocycles, at least one carbon atom is replaced by a heteroatom, preferably from group 15 or 16 of the Periodic Table and in particular nitrogen or sulfur. Such compounds are described, for example, in WO 98/22486. These are, in particular, dimethylsilanediyl(2-methyl-4-phenylindenyl)-(2,5-dimethyl-N-phenyl-4-azapentalene)zirconium dichloride,
dimethylsilanediylbis(2-methyl-4-phenyl-4-hydroazulenyl) zirconium dichloride and
dimethylsilanediylbis(2-ethyl-4-phenyl-4-hydroazulenyl) zirconium dichloride.

Further examples of organic transition metal compounds A) which are suitable for the purposes of the present invention are transition metal complexes with at least one ligand of the formulae (IIa) to (IIe),

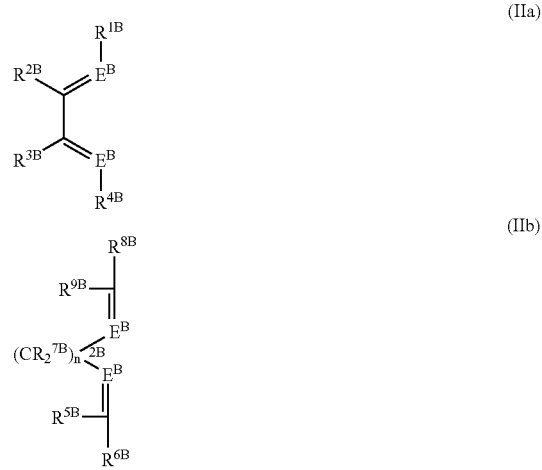

-continued

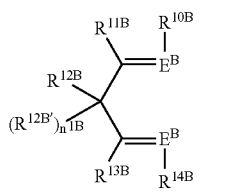
(IIc)

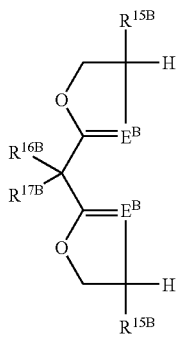
(IId)

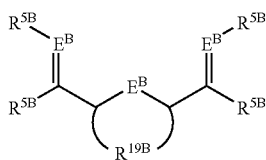
(IIe)

where the transition metal is selected from among the elements Ti, Zr, Hf, Sc, V, Nb, Ta, Cr, Mo, W, Fe, Co, Ni, Pd and Pt or is an element of the rare earth metals. Preference is given to compounds containing nickel, iron, cobalt or palladium as central metal.

$E^B$ is an element of group 15 of the Periodic Table of the Elements, preferably N or P, particularly preferably N. The two or three atoms $E^B$ in a molecule can be identical or different.

The radicals $R^{1B}$ to $R^{19B}$, which can be identical or different within a ligand system of the formulae (IIa) to (IIe), have the following meanings:

$R^{1B}$ and $R^{4B}$ are, independently of one another, hydrocarbon or substituted hydrocarbon radicals, preferably hydrocarbon radicals in which the carbon atom adjacent to the element $E^B$ is connected to at least two carbon atoms, $R^{2B}$ and $R^{3B}$ are each, independently of one another, hydrogen or a hydrocarbon or substituted hydrocarbon radical, where $R^{2B}$ and $R^{3B}$ may also together form a ring system in which one or more heteroatoms may be present, $R^{6B}$ and $R^{8B}$ are, independently of one another, hydrocarbon or substituted hydrocarbon radicals, $R^{5B}$ and $R^{9B}$ are each, independently of one another, hydrogen or a hydrocarbon or substituted hydrocarbon radical, where $R^{6B}$ and $R^{5B}$ or $R^{8B}$ and $R^{9B}$ may also together form a ring system, $R^{7B}$ are each, independently of one another, hydrogen or a hydrocarbon or substituted hydrocarbon radical, where two $R^{7A}$ may also together form a ring system, $R^{10B}$ and $R^{14B}$ are, independently of one another, hydrocarbon or substituted hydrocarbon radicals, $R^{11B}$, $R^{12B}$, $R^{12B'}$ and $R^{13B}$ are each, independently of one another hydrogen or a hydrocarbon or substituted hydrocarbon radical, where two or more geminal or vicinal radicals $R^{11B}$, $R^{12B}$, $R^{12B'}$ and $R^{13B}$ may also together form a ring system, $R^{15B}$ and $R^{18B}$ are each, independently of one another, hydrogen or a hydrocarbon or substituted hydrocarbon radical, $R^{16B}$ and $R^{17B}$ are each, independently of one another, hydrogen or a hydrocarbon or substituted hydrocarbon radical, $R^{19B}$ is an organic radical which forms a 5- to 7-membered substituted or unsubstituted, in particular unsaturated or aromatic, heterocyclic ring system, in particular together with $E^B$ a pyridine system, $n^{1B}$ is 0 or 1, with compounds of the formula (IIc) in which $n^{1B}$ is 0 being negatively charged, and $n^{2B}$ is an integer from 1 to 4, preferably 2 or 3.

Particularly useful transition metal complexes with ligands of the formulae (IIa) to (IId) are, for example, complexes of the transition metals Fe, Co, Ni, Pd or Pt with ligands of the formula (IIa). Particular preference is given to diimine complexes of Ni or Pd, e.g.:

di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)-2,3-dimethyldiazabutadienedimethylpalladium,
di(2,6-di-i-propylphenyl)-2,3-dimethyldiazabutadienedimethylnickel,
di(2,6-dimethylphenyl)-2,3-dimethyldiazabutadienepalladium dichloride,
di(2,6-dimethylphenyl)-2,3-dimethyldiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)-2,3-dimethyldiazabutadienedimethylpalladium,
di(2-methylphenyl)-2,3-dimethyldiazabutadienedimethylnickel,
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyldimethylpalladium or
1,1'-bipyridyldimethylnickel.

Particularly useful compounds (IIe) are those which are described in J. Am. Chem. Soc. 120, p. 4049 ff. (1998), J. Chem. Soc., Chem. Commun. 1998, 849. As complexes containing ligands (IIe), preference is given to using 2,6-bis (imino)pyridyl complexes of the transition metals Fe, Co, Ni, Pd or Pt, in particular Fe.

As organic transition metal compounds A), it is also possible to use iminophenoxide complexes whose ligands are prepared, for example, from substituted or unsubstituted salicylaldehydes and primary amines, in particular substituted or unsubstituted arylamines. Transition metal complexes with pi ligands which contain one or more heteroatoms in the pi system, for example the boratabenzene ligand, the pyrrolyl anion or the phospholyl anion, can also be used as organic transition metal compounds A).

Further transition metal compounds A) which are suitable for the purposes of the present invention are substituted monocyclopentadienyl, monoindenyl, monofluorenyl or heterocyclopentadienyl complexes of chromium, molybdenum or tungsten in which at least one of the substituents on the cyclopentadienyl ring bears a rigid donor function which is not bound exclusively via $sp^3$-hybridized carbon or silicon atoms. The most direct link to the donor function contains at least one sp- or $sp^2$-hybridized carbon atom, preferably from one to three $sp^2$-hybridized carbon atoms. The direct link preferably comprises an unsaturated double bond, an aromatic or together with the donor forms a partially unsaturated or aromatic heterocyclic system.

In these transition metal compounds, the cyclopentadienyl ring can also be a heterocyclopentadienyl ligand, i.e. at least one carbon atom can also be replaced by a heteroatom from group 15 or 16. In this case, preference is given to a carbon atom in the $C_5$-ring being replaced by phosphorus. In particular, the cyclopentadienyl ring is substituted by further alkyl groups which can also form a five- or six-membered ring, e.g. tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide, or unsubstituted, substituted or fused, partially unsaturated heterocyclic or heteroaromatic ring systems.

Preference is here given to using substituted monocyclopentadienyl, monoindenyl, monofluorenyl or heterocyclopentadienyl complexes of the formula (III)

$$[Z^C—M^C—X^C_{n^C}]_{m^C}, \quad \text{(III)}$$

where
$M^C$ is chromium, molybdenum or tungsten and
$Z^C$ has the formula (IIIa)

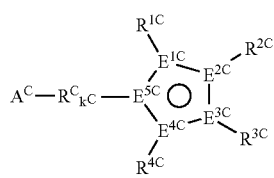

(IIIa)

where the variables have the following meanings:
$E^{1C}$-$E^{5C}$ are each carbon or, for not more than one atom $E^{1C}$ to $E^{5C}$, phosphorus or nitrogen,
$A^C$ is —$NR^{5C}R^{6C}$, —$PR^{5C}R^{6C}$, —$OR^{5C}$, —$SR^{5C}$ or an unsubstituted, substituted or fused, partially unsaturated heterocyclic or heteroaromatic ring system, $R^C$ is one of the following groups:

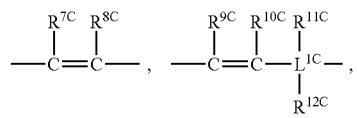

or, if $A^C$ is an unsubstituted, substituted or fused, partially unsaturated heterocyclic or heteroaromatic ring system, may also be

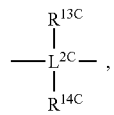

where
$L^{1C}$, $L^{2C}$ are each silicon or carbon,
$k^C$ is 1 or, if $A^{1C}$ is an unsubstituted, substituted or fused, partially unsaturated heterocyclic or heteroaromatic ring system, may also be 0,
$x^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, —$NR^{15C}R^{16C}$, —$OR^{15C}$, —$SR^{15C}$, —$SO_3R^{15C}$, —$OC(O)R^{15C}$, —$CN$, —$SCN$, β-diketonate, —$CO$, $BF_4^-$, $PF_6^-$ or a bulky noncoordinating anion,
$R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}_3$, where the organic radicals $R^{1B}$-$R^{16B}$ may also be substituted by halogens and two geminal or vicinal radicals $R^{1C}$-$R^{16C}$ may also be joined to form a five- or six-membered ring,
$R^{17C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals $R^{17C}$ may also be joined to form a five- or six-membered ring,
$n^C$ is 1, 2 or 3 and
$m^C$ is 1, 2 or 3.

The transition metal $M^C$ is particularly preferably chromium.

Examples of organic transition metal compounds of the formula (III) are
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(8-quinolyl)-2,3,4,5-tetramethylcyclopentadienyl-chromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride, 1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichloride or
1-(8-(2-methylquinolyl))-2-methylbenzindenylchromium (III) dichloride.

The preparation of functional cyclopentadienyl ligands has been known for a long time. Various synthetic routes for these complexing ligands are described, for example, by M. Enders et. al. in Chem. Ber. (1996), 129, 459-463, or P. Jutzi und U. Siemeling in J. Orgmet. Chem. (1995), 500, 175-185.

The metal complexes, in particular the chromium complexes, can be obtained in a simple manner by reacting the corresponding metal salts, e.g. metal chlorides, with the ligand anion (e.g. by a method analogous to the examples in DE-A 197 10 615).

Further transition metal compounds A) which are suitable for the purposes of the present invention are imidochromium compounds of the formula (IV),

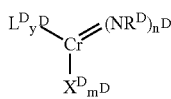

(IV)

where the variables have the following meanings:

$R^D$ is $R^{1D}C=NR^{2D}$, $R^{1D}C=O$, $R^{1D}C=O(OR^2D)$, $R^{1D}C=S$, $(R^{1D})_2P=O$, $(OR^{1D})_2P=O$, $SO_2R^{1D}$, $R^{1D}R^{2D}C=N$, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ and $R^{2D}$ may also bear inert substituents, $X^D$ are each, independently of one another, fluorine, chlorine, bromine, iodine, $-NR^{3D}R^{4D}$, $-NP(R^{3D})_3$, $-OR^{3D}$, $-OSi(R^{3D})_3$, $-SO_3R^{3D}$, $-OC(O)R^{3D}$, β-diketonate, $BF_4^-$, $PF_6^-$ or a bulky weakly coordinating or noncoordinating anion, $R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ to $R^{4D}$ may also bear inert substituents, $n^D$ is 1 or 2, $m^D$ is 1, 2 or 3, where $m^{1D}$ is such that the metallocene complex of the formula (IV) is uncharged for the given valence of Cr, $L^D$ is an uncharged donor, and $Y^D$ is from 0 to 3.

Such compounds and their preparation are described, for example, in WO 01/09148.

Further suitable organic transition metal compounds A) are transition metal complexes with a tridentate macrocyclic ligand, e.g.

[1,3,5-tri(methyl)-1,3,5-triazacyclohexane]chromium trichloride,
[1,3,5-tri(ethyl)-1,3,5-triazacyclohexane]chromium trichloride,
[1,3,5-tri(octyl)-1,3,5-triazacyclohexane]chromium trichloride,
[1,3,5-tri(dodecyl)-1,3,5-triazacyclohexane]chromium trichloride and
[1,3,5-tri(benzyl)-1,3,5-triazacyclohexane]chromium trichloride.

Mixtures of various organic transition metal compounds can also be used as component A).

A further component, namely component B), used in the preparation of the catalyst solid is at least one organometallic compound.

Suitable organometallic compounds B) are ones of the formula (V),

(V)

where
$M^1$ is an alkali metal, an alkaline earth metal or a metal of group 13 of the Periodic Table, i.e. boron, aluminum, gallium, indium or thallium,
$R^1$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy,
$R^2$ and $R^3$ are each hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_1$-$C_{40}$-arylalkyl or halo-$C_1$-$C_{10}$-alkoxy,
r is an integer from 1 to 3 and
s and t are integers from 0 to 2, where the sum r+s+t corresponds to the valence of $M^1$.

Among the metal compounds of the formula (V) preference is given to those in which
$M^1$ is lithium, boron, magnesium or aluminum and
$R^1$, $R^2$ and $R^3$ are each $C_1$-$C_{10}$-alkyl.

Particularly preferred metal compounds of the formula (V) are n-butyllithium, n-butyl-n-octylmagnesium, n-butyl-n-heptylmagnesium, triphenylaluminum, triisoprenaluminum, tri-n-octyl-aluminum, tri-n-hexylaluminum, tri-n-butylaluminum, triisobutylaluminum, tri-n-propylaluminum, tri-isopropylaluminum, triethylaluminum, trispentafluorophenylborane, trimethylaluminum and mixtures thereof.

It is also possible to use mixtures of various metal compounds of the formula (V).

In a preferred embodiment of the process of the present invention for preparing the catalyst solids for olefin polymerization, a mixture of at least two different organometallic compounds is used as component B). This can be a mixture of at least one aluminum-containing organometallic compound and at least one boron-containing organometallic compound. However, the component B) can also comprise at least two different aluminum-containing organometallic compounds.

Furthermore, mixtures of different aluminum-containing organometallic compounds together with boron-containing organometallic compounds can also be used as component B) in the preparation of the catalyst solid.

Furthermore, it is also possible in the preparation of the catalyst solid to add the component B) in portions in a plurality of steps, i.e. a multiple addition of individual organometallic compounds or mixtures of organometallic compounds can be carried out. For example, an organometallic compound or a mixture of organometallic compounds can firstly be brought into contact with one of the other components and this mixture can then be combined with the further components, with one or more of the other components also being able to have been pretreated with one or more of the organometallic compounds. However, for example, multiple addition of one or more of the organometallic compounds to the total mixture is also possible.

As component C) for preparing the catalyst solid, use is made of at least one organic compound which contains at least one functional group containing active hydrogen. Examples of such functional groups are hydroxyl groups, primary and secondary amino groups, mercapto groups, silanol groups, carboxyl groups, amido groups and imido groups, with hydroxyl groups being preferred.

Preferred compounds C) are, in particular, those of the formula

$(R^4)_x\text{-A-(OH)}_y$ (VI)

where

A is an atom of group 13, 14 or 15 of the Periodic Table or a group comprising from 2 to 20 carbon atoms, preferably an atom of group 13 of the Periodic Table, in particular boron or aluminum, or a partially halogenated or perhalogenated $C_1$-$C_{20}$-alkyl or $C_6$-$C_{40}$-aryl group and is particularly preferably an atom of group 13 of the Periodic Table, preferably boron or aluminum and in particular boron, $R^4$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl or $R^4$ is an $OSiR_3^5$ group, where $R^5$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl, and $R^4$ is preferably hydrogen, halogen, $C_6$-$C_{14}$-aryl, $C_6$-$C_{14}$-haloaryl, $C_1$-$C_{14}$-alkyl, $C_1$-$C_{14}$-haloalkyl, $C_7$-$C_{30}$-arylalkyl, $C_7$-$C_{30}$-haloarylalkyl, $C_7$-$C_{30}$-alkylaryl or $C_7$-$C_{30}$-haloalkylaryl and is particularly preferably $C_6$-$C_{10}$-aryl, $C_6$-$C_{10}$-haloaryl, $C_1$-$C_6$-alkyl, $C_1$-$C_6$-haloalkyl, $C_7$-$C_{20}$-alkylaryl or $C_7$-$C_{20}$-haloalkylaryl, y is at least 1 and is preferably from 1 to 5, in particular 1 or 2 and very particularly preferably 1, and x is an integer from 0 to 41, with particular preference being given to x being 2 when y is 1 or being 1 when y is 2.

Examples of preferred compounds of the formula (VI) are borinic acids of the formula $R^4_2B(OH)$ or boronic acids of the formula $R^4B(OH)_2$.

Particularly preferred components C) also include compounds having partially fluorinated or perfluorinated aryl groups, e.g. pentafluorophenol or nonafluorobiphenyl-1-ol or dihydroxyoctafluorobiphenyl. Such compounds C) can also be used in the form of an adduct with from 1 to 10 parts of water. These are then preferably compounds containing two OH groups, for example 4,4'-dihydroxyoctafluorobiphenyl.(s.$H_2O$), 1,2-dihydroxyoctafluorobiphenyl.(s.$H_2O$), 1,8-dihydroxyhexafluoronaphthalene.(s.$H_2O$) or 1,2-dihydroxyhexafluoronaphthalene.(s.$H_2O$), where s is from 1 to 10.

The Lewis bases used as component D) generally have the formula (VIII)

$M^2 R^6 R^7 R^8$ (VII)

where $R^6$, $R^7$ and $R^8$ are identical or different and are each a hydrogen atom, a $C_1$-$C_{20}$-alkyl group, a $C_1$-$C_{20}$-haloalkyl group, a $C_6$-$C_{40}$-aryl group, a $C_6$-$C_{40}$-haloaryl group, a $C_7$-$C_{40}$-alkylaryl group or a $C_7$-$C_{40}$-arylalkyl group, preferably a $C_7$-$C_{40}$-arylalkyl group, where two radicals or all three radicals $R^6$, $R^7$ and $R^8$ may be joined to one another via $C_2$-$C_{20}$ units, $M^2$ is an element of group 15 of the Periodic Table of the Elements.

$R^6$, $R^7$ and $R^8$ are preferably $C_1$-$C_{20}$-alkyl, $C_6$-$C_{40}$-aryl or $C_7$-$C_{40}$-alkylaryl. It is particularly preferred that at least one radical $R^6$, $R^7$ and $R^8$ is a $C_7$-$C_{40}$-arylalkyl group, for example benzyl.

$M^2$ is preferably nitrogen or phosphorus, in particular nitrogen.

Examples of Lewis bases used as component D) are methylamine, aniline, dimethylamine, diethylamine, N-methylaniline, diphenylamine, trimethylamine, triethylamine, tripropylamine, tributylamine, N,N-dimethylaniline, N,N-diethylaniline or N,N-dimethylcyclohexylamine. Particularly preferred Lewis bases are, for example, benzylamine, N-benzyldimethylamine, N-benzyldiethyl-amine, N-benzylbutylamine, N-benzyl-tert-butylamine, N'-benzyl-N,N-dimethylethylenediamine, N-benzylethylenediamine, N-benzylisopropylamine, N-benzylmethylamine, N-benzylethylamine, N-benzyl-1-phenylethylamine, N-benzyl-2-phenylethylamine or N-benzylpiperazine.

Component E) used in the preparation of the catalyst solid is a support. Preference is given to using finely divided supports which can be any organic or inorganic, inert solid. In particular, the support component E) can be a porous support such as talc, a sheet silicate, an inorganic oxide or a finely divided polymer powder.

Inorganic oxides suitable as supports may be found among oxides of the elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used on their own or in combination with the abovementioned oxidic supports are, for example, $ZrO_2$ or $B_2O_3$. Preferred oxides are silicon dioxide, in particular in the form of a silica gel or a pyrogenic silica, or aluminum oxide. A preferred mixed oxide is, for example, calcined hydrotalcite.

The support materials used preferably have a specific surface area in the range from 10 to 1000 $m^2$/g, preferably from 50 to 500 $m^2$/g and in particular from 200 to 400 $m^2$/g, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 µm, preferably from 5 to 350 µm and in particular from 10 to 100 µm.

The inorganic support can be subjected to a thermal treatment, e.g. for removing adsorbed water. Such a drying treatment is generally carried out at from 80 to 300° C., preferably from 100 to 200° C., and is preferably carried out under reduced pressure and/or in a stream of inert gas, for example nitrogen or argon. The inorganic support can also be calcined, in which case the concentration of OH groups on the surface is adjusted and the structure of the solid may be altered by a treatment at from 200 to 1000° C. The support can also be treated chemically using customary desiccants such as metal alkyls, preferably aluminum alkyls, chlorosilanes or $SiCl_4$, or else methyl-aluminoxane. Appropriate treatment methods are described, for example, in WO 00/31090.

The inorganic support material can also be chemically modified. For example, the treatment of silica gel with $NH_4SiF_6$ leads to fluorination of the silica gel surface and treatment of silica gels with silanes containing nitrogen-, fluorine- or sulfur-containing groups gives correspondingly modified silica gel surfaces.

Further possible support materials include finely divided polymer powders, for example polyolefins such as polyethylene or polypropylene or polystyrene. They should preferably be freed of any adhering moisture, solvent residues or other impurities by appropriate purification or drying operations before use. It is also possible to use functionalized polymeric supports, e.g. supports based on polystyrenes, via whose functional groups, for example ammonium or hydroxide groups, at least one of the catalyst components can be immobilized or whose functional groups can simultaneously act as components C) or D).

The process of the present invention for preparing the catalyst solids is carried out by bringing the components A) to E) into contact with one another without any work-up of the mixtures present at intermediate stages being carried out. For the purposes of the present invention, a work-up is, in particular, the isolation of an intermediate, i.e. a separation step in which one or more constituents of the reaction mixture are separated from other constituents of the mixture has to be carried out, for example by filtration, washing, distillation or drying.

The components are usually combined in the presence of an organic solvent in which the support, the reaction products of the support and/or the catalyst solid formed are suspended. Suitable solvents include aromatic or aliphatic solvents, for example hexane, heptane, toluene or xylene or halogenated hydrocarbons such as methylene chloride or halogenated aromatic hydrocarbons such as o-dichlorobenzene.

The components can be combined in any order. It is possible for all components to be added individually in succession. It is also possible for individual components to be mixed with one another first and for these mixtures then to be brought into contact with other mixtures and/or individual components.

A preferred procedure for bringing the components into contact with one another is firstly to bring the organic compound having at least one functional group containing active hydrogen C) into contact with the organometallic compound B), with part of the organometallic compound B) or, when using a mixture of different organometallic compounds, with at least one of the constituents of the component B) and then to add the further components to this mixture or add this mixture to a mixture of some or all further components and subsequently to add any remaining components.

In an alternative preferred procedure, the organometallic compound B), part of the organometallic compound B) or, when using a mixture of different organometallic compounds, at least one of the constituents of the component B) is added to the reaction mixture before the component C). The addition of the component C) can, but does not have to be, carried out directly subsequent to the addition of the component B).

The components are generally combined at from −20° C. to 150° C., preferably in the range from 0° C. to 100° C. When not all of the components are brought into contact simultaneously, the temperature in the individual steps of the combination can be the same. However, the temperatures in the individual steps can also be different.

The time for which the compounds which are being brought into contact with one another are allowed to react is generally from 1 minute to 48 hours. Preference is given to reaction times of from 10 minutes to 6 hours. When the components are brought into contact with one another in steps, the reaction times in the individual steps are usually from 1 minute to 6 hours and preferably from 10 minutes to 2 hours.

The molar ratio of Lewis base D) to functional groups containing active hydrogen of the compounds C) is preferably from 0.05:1 to 4:1, in particular from 0.1:1 to 2:1.

The molar ratio of organic transition metal compound A) to functional groups containing active hydrogen of the compounds C) is preferably from 1:0.1 to 1:1000, in particular from 1:1 to 1:100.

The reaction product obtained after the individual components have been combined can be a solid, a moist solid or a suspension. This reaction product can be used as such, if appropriate together with further constituents of the catalyst system, for the polymerization of olefins. The reaction product is usually worked up further, preferably by drying of the solid. In the case of a suspension, the solid can additionally be separated beforehand from the liquid phase, for example by filtration. Drying is generally carried out at temperatures above room temperature. Preference is given to applying a vacuum during drying. The dried catalyst solid can be used as such or in resuspended form for the polymerization.

Furthermore, the catalyst solid can firstly be prepolymerized with α-olefins, preferably linear $C_2$-$C_{10}$-1-alkenes and in particular ethylene or propylene, and the resulting prepolymerized catalyst solid can then be used in the actual polymerization. The mass ratio of catalyst solid used in the prepolymerization to polymerized-on monomer is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to organic transition metal compound A) is usually from 1:1000 to 1000:1, preferably from 1:5 to 20:1.

The polymerization can be carried out in a known manner, in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes or gas-phase fluidized-bed processes are all possible. As solvent or suspension medium, it is possible to use inert hydrocarbons, for example isobutane, or else the monomers themselves.

The polymerizations can be carried out at from −60 to 300° C. and pressures in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The process of the present invention for preparing catalyst solids for olefin polymerization is relatively simple and requires few, if any, purification steps. The process enables the preparation of catalyst solids having a good polymerization activity using a reduced amount of expensive starting materials such as compounds containing boron or transition metal compounds. In addition, it also enables the preparation of catalyst solids having an increased polymerization activity.

EXAMPLES

Example 1

30 mg of dimethylsilanediylbis(2-methyl-4-(4'-tert-butylphenyl)indenyl)zirconium dichloride, 0.15 ml of triethylaluminum and 0.26 ml of a 20% strength by weight solution of triisobutylaluminum in a high-boiling dearomatized hydrocarbon mixture were suspended in 20 ml of toluene and stirred at 50° C. until a clear solution was obtained. The yellow solution was subsequently brought to room temperature and admixed with 0.69 ml of a 20% strength by weight solution of trimethylaluminum in a high-boiling dearomatized hydrocarbon mixture and 1 g of bis(pentafluorophenyl)borinic acid. After stirring for one hour, 0.1 ml of dimethylbenzylamine was added, and after stirring for a further 30 minutes, 2 g of silica gel (XPO 2107 from Grace) were added. After stirring for another 1 hour, the solvent was distilled off at 50° C. under reduced pressure. This gave 3.09 g of a salmon-colored, free-flowing powder.

Example 2

A dry 2 l reactor was flushed firstly with nitrogen and subsequently with propylene and then charged with 1.5 l of liquid propylene. 3 ml of a 20% strength by weight solution of triisobutylaluminum in a high-boiling dearomatized hydrocarbon mixture were added and the mixture was stirred for 15 minutes. 250 mg of the catalyst system prepared in Example 1 were subsequently suspended in 20 ml of heptane and introduced into the reactor via a lock and were rinsed in using 15 ml of heptane. The reaction mixture was heated to the polymerization temperature of 65° C. and polymerized for 1 hour. This resulted in 450 g of pulverulent polypropylene, corresponding to a productivity of 1.8 kg of PP/g of catalyst solid or an activity of 2.4 kg of PP/mmol of B or 158 kg of PP/mmol of Zr×h. The reactor had no deposits on the interior wall or on the stirrer.

Example 3

0.69 ml of trimethylaluminum and 10 ml of toluene were placed in a reaction vessel and admixed at room temperature with 1 g of bis(pentafluorophenyl)borinic acid. After stirring at room temperature for one hour, 0.1 ml of dimethylbenzylamine were added and the mixture was stirred for a further 15 minutes. A solution of 30 mg of dimethylsilanediylbis(2-methyl-4-(4'-tert-butyl-phenyl)indenyl)zirconium dichloride, 0.15 ml of triethylaluminum and 0.26 ml of triisobutylaluminum in 20 ml of toluene were subsequently added. After stirring at room temperature for 15 minutes, 2.5 g of silica gel (XPO 2107 from Grace) were added and the mixture was stirred at room temperature for 1 hour. The solvent was subsequently distilled off at 50° C. under reduced pressure. This gave 3.57 g of a salmon-red, free-flowing powder.

Example 4

A dry 16 l reactor was flushed firstly with nitrogen and subsequently with propylene and then charged with 10 l of liquid propylene. 6 ml of a 20% strength by weight solution of triisobutylaluminum in a high-boiling dearomatized hydrocarbon mixture were added and the mixture was stirred for 15 minutes. 5 standard liters of hydrogen were subsequently metered in and the mixture was stirred for another 15 minutes. 250 mg of the catalyst system prepared in Example 3 were suspended in 20 ml of heptane and introduced into the reactor via a lock and were rinsed in using 15 ml of heptane. The reaction mixture was heated to the polymerization temperature of 65° C. and polymerized for 1 hour. This resulted in 2.1 kg of pulverulent polypropylene, corresponding to a productivity of 8.4 kg of PP/g of catalyst solid or an activity of 11 kg of PP/mmol of B or 740 kg of PP/mmol of Zr×h. The reactor had no deposits on the interior wall or on the stirrer.

Example 5

1.5 g of silica gel (XPO 2107 from Grace) were suspended in 20 ml of toluene. Firstly 0.15 ml of a 20% strength by weight solution of triethylaluminum and 0.26 ml of a 20% strength by weight solution of triisobutylaluminum in a high-boiling dearomatized hydrocarbon mixture and subsequently 30 mg of dimethylsilanediylbis(2-methyl-4-(4'-tert-butylphenyl)indenyl)zirconium dichloride and 0.2 ml of dimethylbenzylamine were then added. The mixture was subsequently heated to 50° C. and stirred until a clear solution was obtained. A mixture of 1 g of bis(pentafluorophenyl)borinic acid, 0.69 ml of a 20% strength by weight solution of trimethylaluminum in a high-boiling dearomatized hydrocarbon mixture and 10 ml of toluene was added at room temperature. After stirring at room temperature for 1 hour, the solvent was distilled off at 50° C. under reduced pressure. This gave 2.37 g of a salmon-colored, free-flowing powder.

Example 6

A dry 2 l reactor was flushed firstly with nitrogen and subsequently with propylene and then charged with 1.5 l of liquid propylene. 3 ml of a 20% strength by weight solution of triisobutylaluminum in a high-boiling dearomatized hydrocarbon mixture were added and the mixture was stirred for 15 minutes. 250 mg of the catalyst system prepared in Example 5 were subsequently suspended in 20 ml of heptane and introduced into the reactor via a lock and rinsed in using 15 ml of heptane. The reaction mixture was heated to the polymerization temperature of 65° C. and polymerized for 1 hour. This resulted in 169 g of pulverulent polypropylene, corresponding to a productivity of 0.7 kg of PP/g of catalyst solid or an activity of 0.6 kg of PP/mmol of B or 40 kg of PP/mmol of Zr×h. The reactor had no deposits on the interior wall or on the stirrer.

Comparative Example A 5 ml of trimethylaluminum (2 M in toluene, 10 mmol) together with 45 ml of toluene were placed in a reaction vessel. At −10° C., a solution of 6.92 g of bis(pentafluorophenyl)borinic acid (20 mmol) in 50 ml of toluene was slowly added over a period of 15 minutes. The mixture was stirred at −10° C. for 0.5 hour and subsequently at room temperature for a further hour. The slightly turbid, light-yellow solution was filtered through a G4 frit. 2 g of silica gel (XPO 2107 from Grace) were suspended in 30 ml of toluene, and 0.48 ml of N,N-dimethylbenzylamine were added to this suspension at room temperature. The mixture was cooled to 0° C. and 40 ml of the solution prepared above was added from a dropping funnel. The mixture was subsequently warmed to room temperature and stirred for 3 hours. The suspension was then filtered and the solid was washed with pentane. The residue was dried to constant weight in an oil pump vacuum. This resulted in 4.01 g of a white support material.

0.02 ml of trimethylaluminum (2 M in toluene, 40 μmol) was added to a solution of 7 mg of dimethylsilanediylbis(2-methyl-4-(4'-tert-butylphenyl)indenyl)zirconium dichloride (10 mmol) in 5 ml of toluene and the mixture was stirred for 40 minutes. 0.44 g of the previously prepared support was subsequently added at room temperature. The catalyst suspension was stirred for 1 hour and the solvent was then taken off in an oil pump vacuum. This resulted in an orange, free-flowing powder.

Comparative Example B

A dry 2 l reactor was flushed firstly with nitrogen and subsequently with propylene and then charged with 1.5 l of liquid propylene. 3 ml of a 20% strength by weight solution of triisobutylaluminum in a high-boiling dearomatized hydrocarbon mixture were added and the mixture was stirred for 15 minutes. The catalyst system prepared in Comparative Example A (440 mg) was subsequently suspended in 20 ml of heptane and introduced into the reactor via a lock and were rinsed in using 15 ml of heptane. The reaction mixture was heated to the polymerization temperature of 65° C. and polymerized for 1 hour. This resulted in 255 g of pulverulent polypropylene, corresponding to a productivity of 0.6 g of PP/g of catalyst solid or an activity of 0.56 kg of PP/mmol of B or 25.5 kg of PP/mmol of Zr×h. The reactor had no deposits on the interior wall or on the stirrer.

Comparison of Example 2 and Comparative Example B shows that the catalyst systems of the present invention make it possible to produce a larger amount of polypropylene starting from the same starting materials and using a smaller amount of catalyst solid and in particular significantly reduced amounts of metallocene and organoboron compound, i.e. an improved productivity can be achieved.

I claim:

1. A process for preparing a catalyst solid for olefin polymerization by contacting, without any isolation of an intermediate, (A) at least one organic transition metal compound;

(B) at least one organometallic compound of formula (V)

where

M$^1$ is an alkali metal, an alkaline earth metal, or a metal of group 13 of the Periodic Table;

R$^1$ is hydrogen, C$_1$-C$_{10}$-alkyl, C$_6$-C$_{15}$-aryl, halo-C$_1$-C$_{10}$-alkyl, halo-C$_6$-C$_{15}$-aryl, C$_7$-C$_{40}$-arylalkyl, C$_7$-C$_{40}$-alkylaryl, C$_1$-C$_{10}$-alkoxy, halo-C$_7$-C$_{40}$-alkylaryl, halo-C$_7$-C$_{40}$-arylalkyl, or halo-C$_1$-C$_{10}$-alkoxy;

R$^2$ and R$^3$ are each hydrogen, halogen, C$_1$-C$_{10}$-alkyl, C$_6$-C$_{15}$-aryl, halo-C$_1$-C$_{10}$-alkyl, halo-C$_6$-C$_{15}$-aryl, C$_7$-C$_{40}$-arylalkyl, C$_7$-C$_{40}$-alkylaryl, C$_1$-C$_{10}$-alkoxy, halo-C$_7$-C$_{40}$-alkylaryl, halo-C$_7$-C$_{40}$-arylalkyl, or halo-C$_1$-C$_{10}$-alkoxy;

r is an integer from 1 to 3; and s and t are integers from 0 to 2, where the sum r+s+t corresponds to the valence of M$^1$;

(C) at least one organic compound comprising at least one functional group comprising active hydrogen, wherein the functional group is selected from the groups consisting of hydroxyl group, primary and secondary amino groups, mercapto groups, silanol groups, carboxyl groups, amido groups, and imido groups;

(D) at least one Lewis base; and (E) at least one support.

2. The process for preparing a catalyst solid for olefin polymerization as claimed in claim 1, wherein the component (B) is a mixture of at least two different organometallic compounds.

3. The process for preparing a catalyst solid for olefin polymerization as claimed in claim 2, wherein the component (B) is a mixture of at least one aluminum-containing organometallic compound and at least one boron-containing organometallic compound.

4. The process for preparing a catalyst solid for olefin polymerization as claimed in claim 2, wherein the component (B) comprises at least two different aluminum-containing organometallic compounds.

5. The process for preparing a catalyst solid for olefin polymerization as claimed in claim 1, wherein the organic compound of component (C) comprises at least one hydroxyl group.

6. The process for preparing a catalyst solid for olefin polymerization as claimed in claim 5, wherein the component (C) is a compound of formula (VI)

where

A is an atom of group 13, 14 or 15 of the Periodic Table, or a group comprising from 2 to 20 carbon atoms;

R$^4$ are identical or different, and are each independently of one another, hydrogen, halogen, C$_1$-C$_{20}$-alkyl, C$_1$-C$_{20}$-haloalkyl, C$_1$-C$_{10}$-alkoxy, C$_6$-C$_{20}$-aryl, C$_6$-C$_{20}$-haloaryl, C$_{6-C20}$-aryloxy, C$_7$-C$_{40}$-arylalkyl, C$_7$-C$_{40}$-haloarylalkyl, C$_7$-C$_{40}$alkylaryl, C$_7$-C$_{40}$-haloalkylaryl, or OSiR$_3^5$; where R$^5$ are identical or different, and are each independently of one another, hydrogen, halogen, C$_1$-C$_{20}$-alkyl, C$_1$-C$_{20}$-haloalkyl, C$_1$-C$_{10}$-alkoxy, C$_6$-C$_{20}$-aryl, C$_6$-C$_{20}$-haloaryl, C$_6$-C$_{20}$-aryloxy, C$_7$-C$_{40}$-arylalkyl, C$_7$-C$_{40}$-haloarylalkyl, C$_7$-C$_{40}$-alkylaryl, or C$_7$-C$_{40}$-haloalkylaryl;

y is at least 1; and x is an integer from 0 to 41.

7. The process for preparing a catalyst solid for olefin polymerization as claimed in claim 3, wherein the component (B) comprises at least two different aluminum-containing organometallic compounds.

8. The process for preparing a catalyst solid for olefin polymerization as claimed in claim 7, wherein the organic compound of component (C) comprises at least one hydroxyl group.

9. The process for preparing a catalyst solid for olefin polymerization as claimed in claim 8, wherein the component (C) is a compound of formula (VI)

where

A is an atom of main group 13, 14 or 15 of the Periodic Table, or a group comprising from 2 to 20 carbon atoms;

R$^4$ are identical or different, and are each independently of one another, hydrogen, halogen, C$_1$-C$_{20}$-alkyl, C$_1$-C$_{20}$-haloalkyl, C$_1$-C$_{10}$-alkoxy, C$_6$-C$_{20}$-aryl, C$_6$-C$_{20}$-haloaryl, C$_6$-C$_{20}$-aryloxy, C$_7$-C$_{40}$-arylalkyl, C$_7$-C$_{40}$-haloarylalkyl, C$_7$-C$_{40}$-alkylaryl, C$_7$-C$_{40}$-haloalkylaryl, or OSiR$_3^5$, where R$^5$ are identical or different, and are each independently of one another, hydrogen, halogen, C$_1$-C$_{20}$-alkyl, C$_1$-C$_{20}$-haloalkyl, C$_1$-C$_{10}$-alkoxy, C$_{6-C20}$-aryl, C$_6$-C$_{20}$-haloaryl, C$_6$-C$_{20}$-aryloxy, C$_7$-C$_{40}$-arylalkyl, C$_7$-C$_{40}$-haloarylalkyl, C$_7$-C$_{40}$-alkylaryl, or C$_7$-C$_{40}$-haloalkylaryl;

y is at least 1; and x is an integer from 0 to 41.

10. The process for preparing a catalyst solid for olefin polymerization as claimed in claim 8, wherein the component (A) comprises at least one cyclopentadienyl-type ligand.

11. The process for preparing a catalyst solid for olefin polymerization as claimed in claim 1, wherein the component (A) is of formula (I)

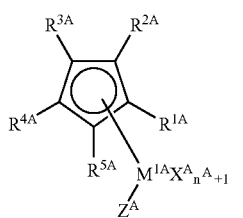

(I)

wherein
$M^{1A}$ is titanium, zirconium, hafnium, vanadium, niobium, tantalum, chromium, molybdenum or tungsten, or an element of group 3 or lanthanides of the Periodic Table;
$X^A$ are identical or different, and are each independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$OR^{6A}$, or —$NR^{6A}R^{7A}$, or two $X^A$ radicals are joined to for a substituted or unsubstituted diene ligand;
$R^{6A}$ and $R^{7A}$ are identical or different, and are each independently of one another, $C_1$-$C_{10}$-alkyl, $C_6$-$C_{15}$-aryl, $C_7$-$C_{40}$-arylalkyl, $C_7$-$C_{40}$-alkylaryl, fluoroalkyl, fluoroaryl, wherein the $C_7$-$C_{40}$-arylalkyl or $C_7$-$C_{40}$-alkylaryl comprise from 1 to 19 carbon atoms in the alkyl radical and from 6 to 21 carbon atoms in the aryl radical;
$n^A$ is 1, 2 or 3, where $n^A$ is such that component (A) of formula (I) is uncharged;
$R^{1A}$ to $R^{5A}$ are identical or different, and are each independently of one another, hydrogen, $C_1$-$C_{22}$-alkyl, 5- to 7-membered cycloalkyl or cycloalkenyl which optionally bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may optionally be substituted by at least one halogen, or two radicals $R^{1A}$ to $R^{5A}$, in particular adjacent radicals, together with the atoms connecting them are joined to form a five-, six- or seven-membered ring, or a five-, six- or seven-membered heterocycle comprising at least one atom selected from the group consisting of N, P, O and S;
$R^{8A}$ are identical or different, and are each independently of one another, $C_1$-$C_{10}$-alkyl, $C_3$-$C_{10}$-cycloalkyl, $C_6$-$C_{15}$-aryl, $C_1$-$C_4$-alkoxy, or $C_6$-$C_{10}$-aryloxy; and
$Z^A$ is as defined for $X^A$, or is

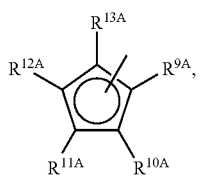

where
$R^{9A}$ to $R^{13A}$ are identical or different, and are each independently of one another, hydrogen, $C_1$-$C_{22}$-alkyl, 5- to 7-membered cycloalkyl or cycloalkenyl which optionally bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, —$OSiR^{14A}_3$, or —$SiR^{14A}_3$, where $R^{9A}$ to $R^{13A}$ may also be substituted by halogen, and/or two radicals $R^{9A}$ to $R^{13A}$ together with the atoms connecting them may be joined to form a five-, six- or seven-membered ring, or a five-, six- or seven-membered heterocycle comprising at least one atom selected from the group consisting of N, P, O and S;
$R^{14A}$ are identical or different, and are each independently of one another, $C_1$-$C_{10}$-alkyl, $C_3$-$C_{10}$-cycloalkyl, $C_6$-$C_{15}$-aryl, $C_1$-$C_4$-alkoxy, or $C_6$-$C_{10}$-aryloxy, or $R^{4A}$ and $Z^A$ together form an —$R^{15A}_v$A—$A^A$— group, where $R^{15A}$ is

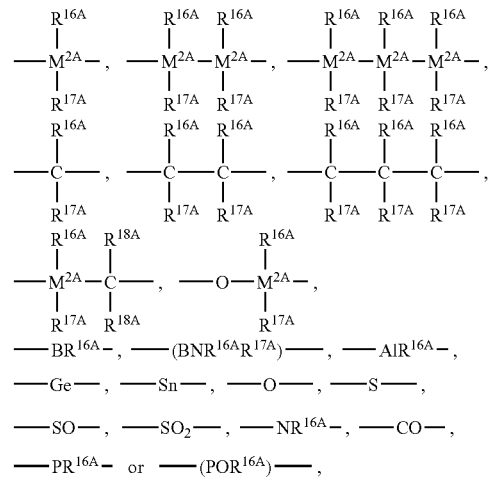

where
$R^{16A}$, $R^{17A}$ and $R^{18A}$ are identical or different, and are each independently of one another, hydrogen, halogen, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$ aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$ arylalkenyl group, or a $C_7$-$C_{40}$-alkylaryl group, or two adjacent radicals together with the atoms connecting them form a saturated or unsaturated ring having from 4 to 15 carbon atoms;
$M^{2A}$ is silicon, germanium, or tin;
$A^A$ is —O—, —S—, —$NR^{19A}$—, —$PR^{19A}$—, —O—$R^{19A}$, —$NR^{19A}_2$, —$PR^{19A}_2$, or an unsubstituted, substituted or fused, heterocyclic ring system, where
$R^{19A}$ are identical or different, and are each independently of one another, $C_1$-$C_{10}$-alkyl, $C_6$-$C_{15}$-aryl, $C_3$-$C_{10}$cycloalkyl, $C_7$-$C_{18}$-alkylaryl, or —$Si(R^{20A})_3$;
$R^{20A}$ is hydrogen, $C_1$-$C_{10}$-alkyl, $C_6$-$C_{15}$-aryl which optionally bear $C_1$-$C_4$-alkyl groups as substituents, or $C_3$-$C_{10}$cycloalkyl; and $v^A$ is 1 or, if $A^A$ is an unsubstituted, substituted or fused, heterocyclic ring system, 1 or 0
or $R^{4A}$ and $R^{12A}$ together form —$R^{15A}$—.

12. The process for preparing a catalyst solid for olefin polymerization as claimed in claim 11, wherein
$X^A$ are identical, and are fluorine, chlorine, bromine, $C_1$-$C_7$-alkyl or arylalkyl, or two $X^A$ together form, a 1,3-diene ligand, or a biaryloxy group; and
$M^{2A}$ is silicon.

13. The process for preparing a catalyst solid for olefin polymerization as claimed in claim 11, wherein the compound of formula (I) is selected from the group consisting of

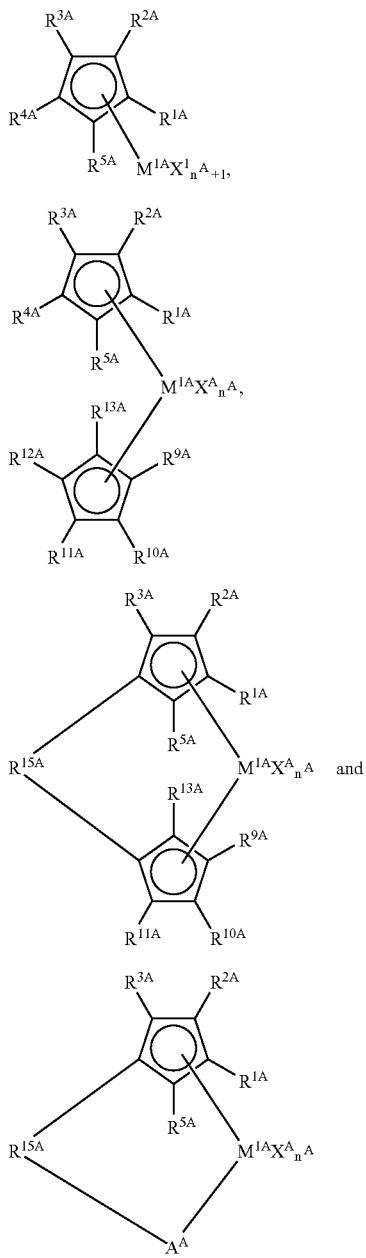

wherein in formula (Ia)
  $M^{1A}$ is titanium or chromium;
  $X^A$ is chlorine, $C_1$-$C_4$-alkyl, phenyl, alkoxy, or aryloxy;
  $n^A$ is 1 or 2; and
  $R^{1A}$ to $R^{5A}$ are each hydrogen, or $C_1$-$C_4$-alkyl, or two adjacent $R^{1A}$ to $R^{5A}$ radicals together with the atoms connecting them form a substituted or unsubstituted, unsaturated six-membered ring;
wherein in formula (Ib)
  $M^{1A}$ is titanium, zirconium, hafnium, or chromium;
  $X^A$ is chlorine, $C_1$-$C_4$-alkyl, or benzyl, or two $X^A$ radicals form a substituted or unsubstituted butadiene ligand;
  $n^A$ is 1 or 2, with the proviso that if $M^{1A}$ is chromium, then $n^A$ is 0;
  $R^{1A}$ to $R^{5A}$ are each hydrogen, $C_1$-$C_8$-alkyl, $C_6$-$C_{10}$-aryl, $-NR^{8A}_2$, $-OSiR^{8A}_3$, $-SiR^{8A}_3$, or $-Si(R^{8A})_3$; and
  $R^{9A}$ to $R^{13A}$ are each hydrogen, $C_1$-$C_8$-alkyl, $C_6$-$C_{10}$-aryl, $-NR^{8A}_2$, $-OSiR^{8A}_3$, $-SiR^{8A}_3$, or $-Si(R^{8A})_3$;
or two $R^{1A}$ to $R^{5A}$ radicals and/or two $R^{9A}$ to $R^{13A}$ radicals together with the cyclopentadienyl ring form an indenyl or substituted indenyl system;
wherein in formula (Ic)
  $R^{1A}$ and $R^{9A}$ are identical or different, and are each independently of one another, hydrogen, or a $C_1$-$C_{10}$-alkyl group;
  $R^{5A}$ and $R^{13A}$ are identical or different, and are each independently of one another, hydrogen, methyl, ethyl, isopropyl, or tert-butyl;
  $R^{3A}$ and $R^{11A}$ are each $C_1$-$C_4$-alkyl; and
  $R^{2A}$ and $R^{10A}$ are each hydrogen; or two adjacent $R^{2A}$ and $R^{3A}$ radicals, or two $R^{10A}$ and $R^{11A}$ radicals together form a saturated or unsaturated cyclic group comprising from 4 to 44 carbon atoms;
  $R^{15A}$ is $-M^{2A}R^{16A}R^{17A}-$, $-CR^{16A}R^{17A}-CR^{16A}R^{17A}-$, $-BR^{16A}-$, or $-BNR^{16A}R^{17A}-$;
  $M^{1A}$ is titanium, zirconium, or hafnium; and
  $X^A$ are identical or different and are each chlorine, $C_1$-$C_4$-alkyl, benzyl, phenyl, or $C_7$-$C_{15}$-alkylaryloxy;
wherein in formula (Id)
  $M^{1A}$ is titanium, or zirconium;
  $X^A$ is chlorine, $C_1$-$C_4$alkyl, or phenyl, or two X radicals together form a substituted or unsubstituted butadiene ligand;
  $R^{15A}$ is $-SiR^{16A}R^{17A}-$, or $-CR^{16A}R^{17A}-CR^{16A}R^{17A}-$; and
  $A^A$ is $-O-$, $-S-$, or $-NR^{19A}-$;
  $R^{1A}$ to $R^{3A}$ and $R^{5A}$ are each hydrogen, $C_1$-$C_{10}$-alkyl, $C_3$-$C_{10}$-cycloalkyl, $C_6$-$C_{15}$-aryl, or $-Si(R^{8A})_3$, or two adjacent radicals form a cyclic group comprising from 4 to 12 carbon atoms.

14. The process for preparing a catalyst solid for olefin polymerization as claimed in claim 9, wherein the component (A) is
  bis(cyclopentadienyl)zirconium dichloride,
  bis(pentamethylcyclopentadienyl)zirconium dichloride,
  bis(methylcyclopentadienyl)zirconium dichloride,
  bis(ethylcyclopentadienyl)zirconium dichloride,
  bis(n-butylcyclopentadienyl)zirconium dichloride,
  bis(1-n-butyl-3-methylcyclopentadienyl)zirconium dichloride,
  bis(indenyl)zirconium dichloride,
  bis(tetrahydroindenyl)zirconium dichloride,
  bis(trimethylsilylcyclopentadienyl)zirconium dichloride,
  bis(cyclopentadienyl)zirconium dimethyl,
  bis(pentamethylcyclopentadienyl)zirconium dimethyl,
  bis(methylcyclopentadienyl)zirconium dimethyl,
  bis(ethylcyclopentadienyl)zirconium dimethyl,
  bis(n-butylcyclopentadienyl)zirconium dimethyl,
  bis(1-n-butyl-3-methylcyclopentadienyl)zirconium dimethyl,
  bis(indenyl)zirconium dimethyl,
  bis(tetrahydroindenyl)zirconium didimethyl,
  bis(trimethylsilylcyclopentadienyl)zirconium dimethyl,
  dimethylsilanediyl(2-methyl-4-phenylindenyl)-(2,5dimethyl-N-phenyl-4-azapentalene)zirconium dichloride,
  dimethylsilanediylbis(2-methyl-4-phenyl-4-hydroazulenyl)zirconium dichloride,
  dimethylsilanecliylbis(2-ethyl-4-phenyl-4-hydroazulenyl)zirconium dichloride, dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanedlylbis(3-methyl-5-methylcyclopentadienyl)zirconium dichloride,
dimethylsilanedlylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride
dimethylsilanediylbis(2-ethyl-4,5-benzindenyl)zirconium dichloride
methylphenylsilanediylbis(2-methyl-4,5-benzindenyl)zirconium dichloride,
methylphenylsilanediylbis(2-ethyl-4,5benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4(1-naphthyl)indenyl)zirconium dichloride,
dimethylsilanediylbis (2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl) zirconium dichloride,
dimethylsilanediylbis(2-methyl-4,6-diisopropylindenyl) zirconium dichloride,
dimethylsilanediylbis (2-methyl-4[p-trifluoromethyiphenyl]indenyl)zirconium dichloride,
dimethylsilanediylbis(2-methyl-4-[3',5'-dimethyiphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanedlylbis(2ethyl-4-[4'-tert-butylphenyl]indenyl)zirconium dichloride,
dimethylsilanediylbis(2propyl-4-[4'-tert-butylphenyl]indenyl)zirconium dichloride,
dimethylsilanecliylbis(2isopropyl-4-[4'-tert-butylphenyl]indenyl)zirconium dichloride,
dimethylsilanediylbis(2n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)-(2-methyl-4-phenylindenyl)zirconium dichloride,
dimethylsilanediyl(2-isopropyl-4-(1-naphthyl)indenyl)-(2-methyl4-(1-naphthyl)indenyl)zirconium dichloride,
dimethylsilanediyl(2-isopropyl-4-[4'-tert-butylphenyl]indenyl)-(2methyl-4-[4'-tert-butylphenyl]-indenyl)zirconium dichloride,
dimethylsilanediyl(2-isopropyl-4-[4'-tert-butylphenyl]indenyl)-(2-ethyl-4-[4'-tert-butylphenyl]-indenyl)zirconium dichloride,
dimethylsilanediyl(2-isopropyl-4-[4'-tert-butylphenyl]indenyl)-(2-methyl-4-[3',5'-bis-tert-butylphenyl]indenyl)zirconium dichloride,
dimethylsilanediyl(2-isopropyl-4-[4'-tert-butylphenyl]indenyl)-(2-methyl-4-[1'-naphthyl]indenyl)zirconium dichloride,
ethylene(2isopropyl-4-[4'-tert-butylphenyl]indenyl)-(2-methyl-4-[4'tert-butylphenyl]indenyl)zirconium dichloride,
di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)-2,3-dimethyldiazabutadienedimethylpalladium,
di(2,6-di-i-propylphenyl)-2,3-dimethyldiazabutadienedimethylnickel,
di(2,6-dimethyiphenyl)-2,3-dimethyldiazabutadienepalladium dichloride,
di(2,6-dimethyiphenyl)-2,3-dimethyldiazabutadienickel dichloride,
di(2,6-dimethyiphenyl)-2,3-dimethyldiazabutadienedimethylpalladium,
di(2,6-dimethyiphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)2,3-dimethyldiazabutadienedimethylpalladium,
di(2-methylphenyl)2,3-dimethyldiazabutadienedimethylnickel,
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2 6-dimethyiphenyl)azanaphthenenickel dichloride,
di(2,6-dimethyiphenyl)azanaphthenedimethylpalladium,
di(2,6-dimethyiphenyl)azanaphthenedimethylnickel, 1,1'-bipyridylpalladium dichloride,
1,1'-bipyridylnickel dichloride,
1,1'-bipyridyldimethylpalladium,
1,1'-bipyridyldimethylnickel,
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(8quinolyl)-2,3,4,5 -tetramethylcyclopentadienylchromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl) 2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichloride,
1-(8-(2-methylquinolyl))-2-methylbenzindenylchromium(III) dichloride,
[1,3,5-tri(methyl)-1,3,5-triazacyclohexane]chromium trichloride,
[1,3,5-tri(ethyl)-1,3,5-triazacyclohexane]chromium trichloride,
[1,3,5-tri(octyl)-1,3,5-triazacyclohexane]chromium trichloride,
[1,3,5-tri(dodecyl)-1,3,5-triazacyclohexane]chromium trichloride,
[1,3,5-tri(benzyl)-1,3,5-triazacyclohexane]chromium trichloride, or mixtures thereof.

15. The process for preparing a catalyst solid for olefin polymerization as claimed in claim 1, wherein said organometallic compound of formula (V) is n-butyllithium, n-butyl-n-octylmagnesium, n-butyl-n-heptylmagnesium, triphenylaluminum, triisoprenaluminum, tri-n-octylaluminum, tri-n-hexylaluminum, tri-n-butylaluminum, triisobutylaluminum, tri-n-propylaluminum, tri-isopropylaluminum, triethylaluminum, trispentafluorophenylborane, trimethylaluminum, or mixtures thereof.

16. The process for preparing a catalyst solid for olefin polymerization as claimed in claim 14, wherein said organometallic compound of formula (V) is n-butyllithium, n-butyl-n-octylmagnesium, n-butyl-n-heptylmagnesium, triphenylaluminum, triisoprenaluminum, tri-n-octylaluminum, tri-n-hexylaluminum, tri-n-butylaluminum, triisobutylaluminum, tri-n-propylaluminum, tri-isopropylaluminum, triethylaluminum, trispentafluorophenylborane, trimethylaluminum, or mixtures thereof.

17. The process for preparing a catalyst solid for olefin polymerization as claimed in claim 6, wherein said organometallic compound of formula (VI) is at least one borinic acid of formula $R^4_2B(OH)$, or at least one boronic acid of formula $R^4B(OH)_2$.

18. The process for preparing a catalyst solid for olefin polymerization as claimed in claim 1, wherein said Lewis base is methylamine, aniline, dimethylamine, diethylamine, N-methylaniline, diphenylamine, trimethylamine, triethylamine, tripropylamine, tributylamine, N,N-dimethylaniline, N,N-diethylaniline, N,N-dimethylcyclohexylamine, benzylamine, N-benzyldimethylamine, N-benzyldiethylamine, N-benzylbutylamine, N-benzyl-tert-butylamine, N'-benzyl-N, N-dimethylethylenediamine, N-benzylethylenediamine, N-benzylisopropylamine, N-benzylmethylamine, N-benzylethylamine, N-benzyl-1-phenylethylamine, N-benzyl-2-phenylethylamine, N-benzylpiperazine, or mixtures thereof.

19. The process for preparing a catalyst solid for olefin polymerization as claimed in claim 17, wherein said Lewis base is methylamine, aniline, dimethylamine, diethylamine, N-methylaniline, diphenylamine, trimethylamine, triethylamine, tripropylamine, tributylamine, N,N-dimethylaniline, N,N-diethylaniline, N,N-dimethylcyclohexylamine, benzylamine, N-benzyldimethylamine, N-benzyldiethylamine, N-benzylbutylamine, N-benzyl-tert- butylamine, N'-benzyl-N,N-dimethylethylenediamine, N-benzylethylenediamine, N-benzylisopropylamine, N-benzylmethylamine, N-benzylethylamine, N-benzyl-1-phenylethylamine, N-benzyl-2-phenylethylamine, N-benzylpiperazine, or mixtures thereof.

20. The process for preparing a catalyst solid for olefin polymerization as claimed in claim 1, wherein in formula (V) $M^1$ is lithium, boron, magnesium, or aluminum; and $R^1$, $R^2$, and $R^3$ are each a $C_1$-$C_{10}$-alkyl.

* * * * *